July 1, 1924.
E. J. THURBER
CURTAIN FOR AUTOMOBILES
Filed Oct. 4, 1923    2 Sheets-Sheet 1
1,500,014
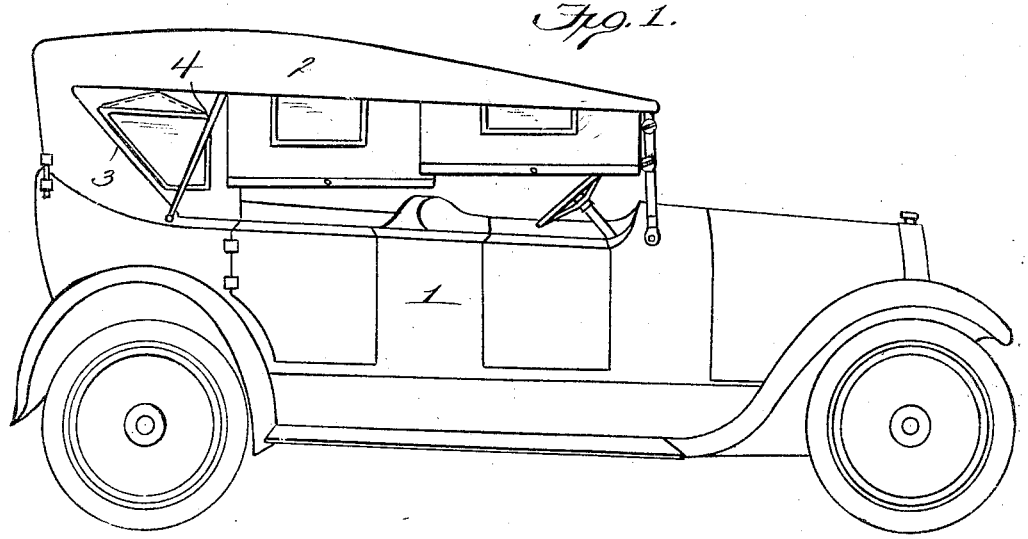
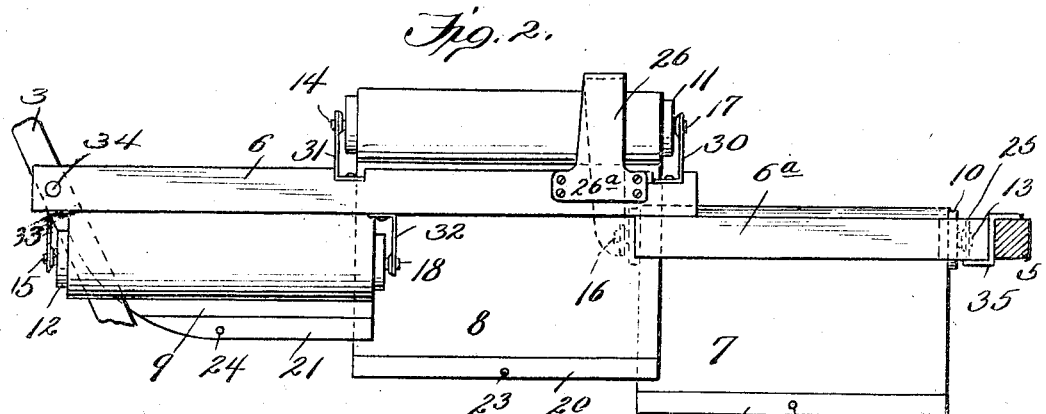
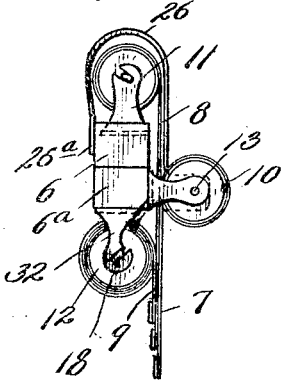
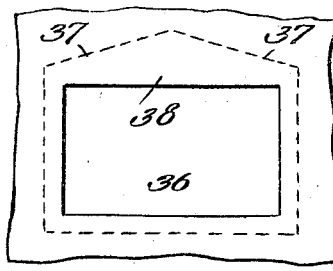
Inventor
Edward J. Thurber
By
F. H. Cook
Attorney

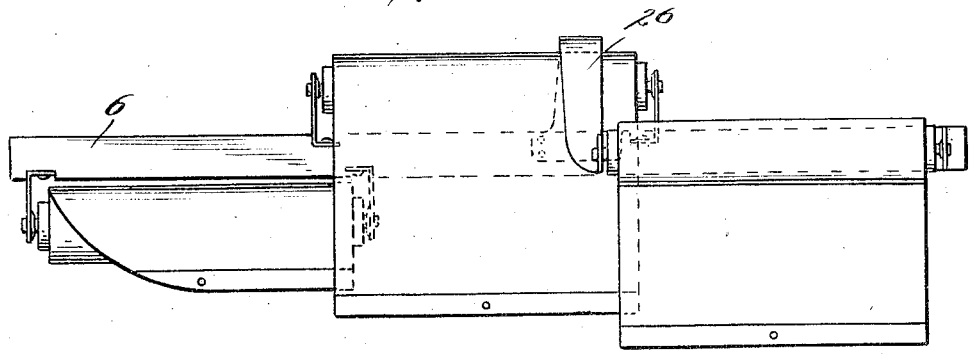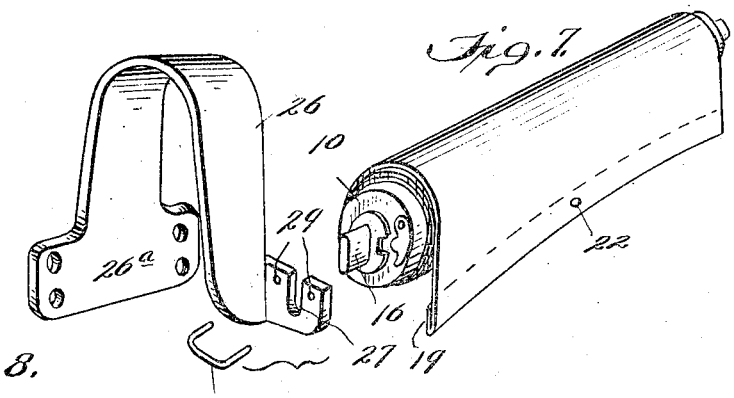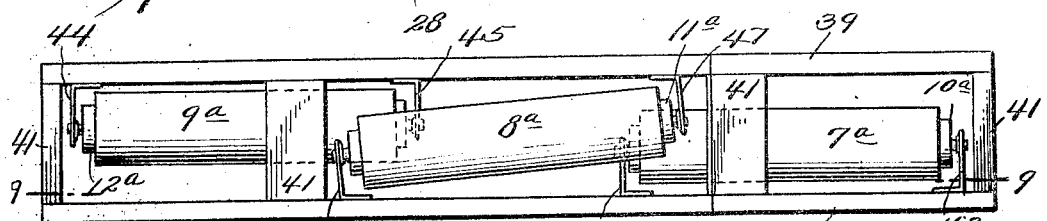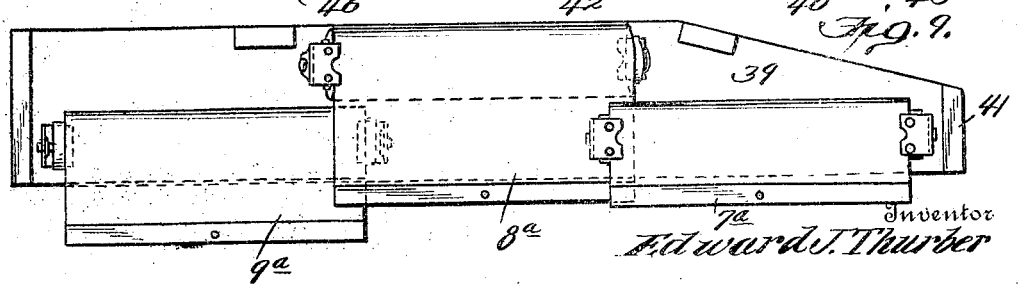

Patented July 1, 1924.

1,500,014

UNITED STATES PATENT OFFICE.

EDWARD J. THURBER, OF NEW ORLEANS, LOUISIANA.

CURTAIN FOR AUTOMOBILES.

Application filed October 4, 1923. Serial No. 666,559.

*To all whom it may concern:*

Be it known that I, EDWARD J. THURBER, a citizen of the United States, residing at New Orleans, in the parish of Orleans and State of Louisiana, have invented certain new and useful Improvements in Curtains for Automobiles, of which the following is a specification.

This invention relates to improvements in curtains adapted particularly for use on vehicles, and more especially on automobiles of the open types using the conventional forms of tops, and the primary objects of the invention are to provide novel and improved roller curtain structure which enables the curtains to be easily and quickly brought into use and also restored to their concealed or inoperative position, it avoiding the inconvenience and delay of hanging the curtains each time they are needed, as is necessary with the separate curtains now generally used and which must be removed, folded and stored away in compartments when not in use; to provide a roller curtain structure which enables the curtain sections to fit together closely, thereby protecting the occupants of the car from the weather; to provide roller curtain structure which is capable of being readily installed in permanent positions in automobile tops of the conventional forms generally used on automobiles of the open type, in such manner that the curtain structure is neatly concealed and is practically invisible from the exterior of the car when the curtains are not in use; and to provide a curtain structure which is durable and which facilitates rolling of the curtain sections, thereby avoiding injury to the transparent windows in the curtain sections such as occurs from folding curtains of the kind heretofore used.

To these, and other ends, the invention consists in certain improvements and combinations and arrangements of parts, all as will be hereinafter more fully described, the features of novelty being pointed out particularly in the claims at the end of the specification.

In the accompanying drawing:—

Figure 1 is a side elevation of an automobile of the open type equipped with a top of conventional form, the same having roller curtain structure embodying the present invention applied thereto;

Figure 2 is a detail view on an enlarged scale of one form of roller curtain structure for use on the left-hand side of an automobile;

Figure 3 represents a front end elevation of the roller curtain structure shown in Figure 2, looking toward the left in said figure;

Figure 4 is a detail view of a portion of one of the roller curtains illustrating the manner in which the upper edge of the transparent flexible window is preferably formed in order to facilitate its rolling;

Figure 5 is a view similar to Figure 2, showing another embodiment of the invention;

Figure 6 is a detail perspective view of one of the brackets used in the structure illustrated in Figures 2, 3 and 4 for supporting the rear end of the front roller curtain, this view also showing a roller retaining device for the bracket.

Figure 7 is a detail perspective view of one of the roller curtains;

Figure 8 is a top plan view of another embodiment of the invention; and

Figure 9 represents a section taken in a vertical plane along the line 9—9 of Figure 8.

Similar parts are designated by the same reference characters in the several figures.

Curtain structures constructed in accordance with the present invention are applicable generally to vehicles and especially automobiles for the purpose of closing the sides thereof and to thus protect the occupants when such is desirable. The invention is more particularly applicable to automobiles of the open type using tops of conventional form, the roller curtain structure provided by the present invention being intended to replace the separate curtains such as those heretofore used generally but which present many objections, the roller structure means of the present invention being readily applicable to automobiles using tops of the conventional form in such manner that the roller structure is concealed and practically invisible when not in use, although the curtains may be easily and quickly brought into use when needed, and, moreover, the curtains are rolled and stored in a manner which avoids injury thereto. The preferred embodiments of the invention are shown in the accompanying drawings and will be hereinafter described in detail. It is to be understood, however, that the invention is not restricted to the precise constructions shown, as equivalent constructions are contemplated and such will be included within the scope of the claims.

In the present instance, 1 represents an automobile of the touring car type, the same being equipped with a top 2 which is of the conventional form generally used on automobiles of the open type, tops of such form commonly having rear bows 3 and 4 and a front frame 5 which constitute parts of their structure.

The curtain structure according to the present invention comprises a pair of curtain mountings 6, one of which is to be secured within the top and immediately above the lower edge of the vertical side portion of the top, one curtain mounting being applied at each longitudinal side of the top. Each curtain mounting may consist of a straight strip of wood or other suitable material, as shown in Figure 5, or in those instances where the vertical side portion of the top is very shallow toward the front of the top, the front end of the mounting may have an offset portion 6ª, as shown in Figure 2, which is offset below the main or rear portion of the strip, thus facilitating the accommodation of the roller curtains within the shallow space available within the top. The curtain structure for touring cars embodies preferably a set of three curtain sections 7, 8 and 9, these curtain sections each comprising a strip of suitable flexible waterproof material, one end of which is fixed to a spring tensioned roller 10, 11 or 12 similar to that used for ordinary spring actuated roller curtains as used in windows, one end of each roller having a pivot pin 13, 14 or 15, and the other end of which roller having a shaft attached to its spring, the end of which shaft is flattened, as at 16, 17 or 18. The spring in each roller acts to automatically roll the curtain on to the roller, although permitting the curtain to be unrolled therefrom when tension is applied to the free end of the curtain. The free end of each curtain preferably has a strip 19, 20 or 21 fixed thereto and this strip, which may be composed of any suitable springy material, is slightly curved and is provided with an eyelet 22, 23 or 24 which is adapted to be fastened to a stud or other suitable fastening on the side of the body of the automobile after the curtain has been pulled down and unrolled from its roller. The convex form of the strip on the lower edge of each curtain insures contact of this edge throughout its length with the side of the body of the automobile, thereby forming a close or weather-tight joint.

The roller for the forward curtain section 7 is supported on the mounting 6 by a pair of brackets 25 and 26, the bracket 25 receiving the pivot pin 13 of the roller and the bracket 26 having a slot 27 into which the flattened end 16 of the shaft of this roller fits non-rotatably, a staple 28 being preferably provided, the ends of which may be inserted through openings 29 in the bracket 26 above the flattened end 16 of the roller to retain the roller from displacement. The brackets 25 and 26 support the roller for the forward curtain section 7 at the outer side of the mounting 6, Figure 2 representing a curtain structure for the left-hand side of the automobile top, and Figure 5 representing a curtain structure for the right-hand side of an automobile top. The roller 11 for the intermediate section 8 is supported on the top or upper side of the mounting 6 by brackets 30 and 31, the bracket 31 receiving the pivot pin 14 of this roller and the bracket 30 being slotted to receive the squared end 17 on the shaft of this roller. The roller 12 for the rear curtain section 9 is mounted on the under side of the mounting 6 by brackets 32 and 33, the bracket 33 receiving the pivot pin of this roller while the bracket 32 is slotted to receive the squared end 18 on the shaft of such roller. By mounting and arranging the roller curtains in the manner just described, it is possible to bring the curtains to lie substantially in the same plane and to secure the necessary and correct overlap between the vertical edges of the curtains to render the curtains weather-proof. By referring to Figure 3, it will be observed that the roller 10 for the forward curtain section 7 revolves in an anti-clockwise direction when the forward curtain section 7 is being pulled down into position for use, while the rollers 11 and 12 for the intermediate and rear curtain sections 8 and 9 both revolve in a clockwise direction when these latter curtain sections are being pulled down into position for use, and the arrangement of the rollers 10, 11 and 12 is such that the unwound portions of the curtains 7, 8 and 9 all lie substantially in the same plane. Furthermore, it will be observed from Figure 2 that the vertical edges of the intermediate curtain section 8 overlap the front and rear curtain sections 7 and 9, the forward vertical edge of the curtain 8 lapping the inner side of the forward curtain section 7, while the rear vertical edge of the curtain section 8 laps the outer side of the rear curtain section 9. By this arrangement, close weatherproof fits are obtained between the curtain sections and driving of wind or rain into the car between the vertical edges of the curtain sections, due to the forward motion of the car, is avoided. In order to support the bracket 26 for the rear end of the forward roller 10 on the mounting 6 in such a manner as to avoid interference with the intermediate roller 11 of this curtain section 8, this bracket 26 is in the from of a loop or inverted yoke, the intermediate portion of which bridges or extends over the top of the roller 11, one end of the bracket, which as previously described supports the rear end of the forward roller 10, lying at the outer side of the intermediate curtain section 8 while the other end 26ª of this bracket extends down to and is secured against the inner side of the mounting 6 by screws or other suitable means.

The mounting 6 of each side of the top may be secured in place by fastening its rear end to one of the rear bows of the top, such as the bow 3, by means of a screw 34, and the forward end of the mounting may be attached to the front frame 5 of the top by means of a bracket 35. It will be understood that Figure 2 shows a roller structure for the left-hand side of the top, the same being viewed from the inner side, and that a similar structure which, however, has the rollers reversed on the mounting substantially as is shown in Figure 5, will be used for the right-hand side of the top.

The roller sections are preferably provided with transparent windows 36 composed of celluloid or other suitable flexible material. In order to facilitate rolling of curtains embodying such transparent flexible windows and to avoid or minimize cracking or breaking of such windows, the transparent flexible sheets composing these windows may be sewed in the curtains, but their upper edges 37 are convergent, forming a substantially pointed portion 38, as shown in Figure 4. By forming the upper edge of the transparent flexible window in this way, the rolling thereof will be greatly facilitated and danger of cracking or breaking the window will be minimized. It will be understood that the lower edges of the curtain sections will be shaped to conform with the slope or other shape of the sides of the automobile body in order that proper fitting of the curtain sections may be obtained.

In applying roller structure of the kind hereinbefore described to automobiles having relatively short tops such, for example, as those used upon roadsters, the mountings 6 may be shortened and the rear curtain section 9, together with its roller 12 and supporting brackets, may be omitted, the curtain sections 7 and 8 in such cases being sufficient. It is contemplated, in the case of some automobile tops, to articulate or pivotally connect the members 6 and 6ᵉ at the point of the offset so as to render more convenient the installation of the curtains and to insure a better fit, the curtains being thus made to conform with the shape of the automobile top or body, or both.

In the curtain structure illustrated in Figures 8 and 9, which is adapted for use at the right-hand side of the top of a touring car, the forward, intermediate and rear curtain sections 7ª, 8ª and 9ª, respectively, are attached to rollers 10ª, 11ª and 12ª, which may be similar to those used in the constructions shown in Figures 1 to 5, inclusive, and 7. The mounting for these rollers, however, comprises a box-like frame or housing embodying longitudinal members 39 and 40 and transverse members 41, the rollers being contained and housed within the frame. The roller for the forward curtain section 7ª has brackets 42 and 43 which are secured to the inner side of the longitudinal member 40, so that the axis of this roller is parallel to the length of the frame, and the roller 12ª for the rear curtain section 9ª is supported by brackets 44 and 45 which are secured to the inner side of the opposite longitudinal frame member 39, the axis of this roller being also parallel with the length of the frame but the axis of the rear roller 12ª is preferably offset inwardly with respect to the axis of the forward roller 7. The roller 11ª for the intermediate curtain section 8ª is supported by a bracket 46 which is attached to the inner side of the longitudinal frame member 40 and by the bracket 47 which is attached to the inner side of the opposite inner frame member 39, so that the axis of the roller 11ª extends obliquely or diagonally with respect to the axes of the rollers 10ª and 12ª. The curtain section 7ª is so attached to this roller 10ª as to cause the curtain to pass off the inner side of this roller when such curtain section is being unwound, whereas the curtain sections 8ª and 9ª pass off the outer sides of their rollers 11ª and 12ª when such curtain sections are being unwound. This arrangement of the rollers brings the curtain sections into approximately the same plane and into continuity, and as the forward and rear vertical edges of the intermediate curtain section 8ª overlap the rear edge of the forward curtain section 7ª at its inner side and the forward vertical edge of the rear curtain section 9ª at its outer side, close weather-tight fits are obtained between the curtain sections. When desired the brackets 46 and 47 may be attached to the under side of the intermediate transverse members 41, by bringing said members closer together, so that, when the roller 11ª is mounted in this way it will be substantially parallel with the length of the frame.

Curtain structures as hereinbefore described are applicable with facility to the conventional tops generally used on automobiles and they obviate the objections inherent in automobile side curtains of the kinds heretofore used. By employing curtain sections attached to rollers and mounting them in the top and at the longitudinal sides thereof, the curtains are, when not in use, stored in positions which render them practically invisible from the exterior to the automobile and the curtain sections, moreover, are stored in such condition that cracking or other injury thereto, as results from folding and storing of curtains of the usual kind, is avoided or minimized, although the curtains may be easily and quickly drawn down into position for use and readily restored when they are not needed. The arrangement of the curtains is such that close weather-tight joints are formed between their vertical edges, and, moreover, the curtains at each side, when lowered and fastened, will lie in the same plane, or substantially so, and hence the appearance of the curtains when in use is enhanced and the overlapped edges of the curtains will fit closely and evenly.

I claim as my invention:—

1. Curtain structure for automobile tops comprising a support, and front and intermediate roller curtains mounted thereon at different portions of its length, the roller of said front curtain extending endwise beyond the forward end of the roller of the intermediate curtain and offset outwardly therefrom, the portions of the peripheries of the rollers from which the curtains unwind lying in substantially the same vertical plane as viewed endwise whereby said curtains, when unwound from their rollers, overlap at their adjacent edges, and a rear roller curtain having its roller located at a different elevation relatively to the roller of said intermediate curtain, the rear edge of the front curtain overlapping the outer side of the forward edge of the intermediate curtain, and the rear edge of the intermediate curtain overlapping the outer side of the forward edge of the rear curtain.

2. Curtain structure for automobile tops comprising a support, and a set of three roller curtains mounted at intervals in the length thereof, the ends of the roller of one curtain overlapping the adjacent ends of the rollers of adjacent curtains and the unwound portion of said curtain overlapping at one edge one side of the unwound portion of one adjacent curtain and overlapping at its other edge the opposite side of the other adjacent curtain, the rollers of a pair of said curtains being located at different elevations and both revoluble in the same direction in unwinding, and a third curtain having its roller offset laterally with respect to the plane occupied by the rollers of said pair of curtains as viewed endwise, the roller of said offset curtain and the rollers of said pair of curtains being revoluble in relatively reverse directions in unwinding whereby the portions of said curtains which unwind directly from the rollers will lie in substantially the same vertical plane.

3. Curtain structure of the class described comprising a plurality of roller crtains, the rollers of two of said curtains being in superposed relation as viewed endwise, and the roller of a third curtain being offset laterally of the plane occupied by said superposed curtain rollers, the roller of said offset curtain being operative to revolve in a reverse direction relatively to the direction of rotation of the rollers of said other curtains when the curtains are unwinding, and the rollers of said curtains being mounted so that an edge of the unwound portion of one curtain overlaps one side of the unwound portion of one of the other curtains and its other edge overlaps the opposite side of the unwound portion of the remaining curtain.

4. Curtain structure of the class described comprising a support, a pair of roller curtains having their rollers arranged in superposed relation as viewed endwise, and a third roller curtain having its roller offset laterally of the plane occupied by the rollers of said pair of curtains, the roller of said offset curtain and the rollers of said pair of curtains being revoluble in relatively reverse directions while the curtains are unrolled and one edge of one of the curtains being overlapped at its inner side by the edge of one of the other curtains and having its other edge overlapped at its outer side by the edge of the other curtain.

5. Curtain structure of the class described comprising a supporting mounting, a roller curtain supported on the upper side of said mounting, another roller curtain arranged at a side of the mounting, and a bracket attached to the side of the mounting remote from the second-mentioned curtain and extending to the side of the mounting at which the second-mentioned curtain is arranged, said bracket supporting the end of the roller of said second-mentioned curtain which is adjacent to the first-mentioned curtain.

6. Curtain structure of the character described comprising a mounting, and roller curtains mounted respectively at the top and at one side of the mounting, the adjacent ends of the rollers of said curtains being in overlapping relation, and a loop-shaped bracket having one end secured to the mounting, the intermediate portion of the bracket extending over the curtain at the top of the mounting and the other end of the bracket extending downwardly and supporting an end of the roller which is mounted at the side of the mounting.

7. Curtain structure of the character described comprising a mounting, and roller curtains supported thereon, the rollers of a pair of said curtains being arranged in vertically superposed relation as viewed endwise, and the roller of a third curtain being offset laterally of the plane occupied by the rollers of said pair of curtains, the axes of the rollers of said curtains being arranged substantially longitudinally on the mounting with the adjacent ends of the rollers in overlapping relation, the rollers being thereby operative to bring the opposite edges of the portion of the curtain unwound from one of said rollers into overlapping relation respectively with the inner side of one of the other curtains and with the outer side of another of said other curtains and in substantially the same plane.

8. Curtain structure of the character described comprising a set of three roller curtains mounted with their axes of rotation positioned substantially at the three points of a triangle as viewed endwise, the rollers of two of said curtains being relatively displaced vertically and the roller of the third curtain being displaced laterally of the plane occupied by the rollers of said curtains, and one of said rollers being revoluble in a reverse direction relatively to the direction of rotation of the other rollers in unwinding whereby the portions of the peripheries of the rollers from which the curtains unwind lie in substantially the same vertical plane.

9. Curtain structure of the character described comprising a set of roller curtains mounted with their axes of rotation located at the three points of a triangle as viewed endwise, the rollers of a pair of said curtains being relatively displaced vertically, and the roller of a third curtain being displaced laterally of the plane occupied by the rollers of said pair of curtains, the rollers of certain of said curtains being rotatable in reverse directions in unwinding and the edges of the portions of said curtains directly unwinding from the rollers lying in substantially the same vertical plane and being in lapped relation.

In testimony whereof I have hereunto set my hand.

EDWARD J. THURBER.

Witnesses:
D. WILKINSON,
H. H. SMITH.